US006998096B2

(12) United States Patent
Ishikawa (10) Patent No.: US 6,998,096 B2
(45) Date of Patent: Feb. 14, 2006

(54) FUEL REFORMER FOR USE IN FUEL CELL

(75) Inventor: Takashi Ishikawa, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 644 days.

(21) Appl. No.: 10/097,968

(22) Filed: Mar. 15, 2002

(65) Prior Publication Data

US 2002/0131921 A1    Sep. 19, 2002

(30) Foreign Application Priority Data

Mar. 15, 2001  (JP) .............................. 2001-074729

(51) Int. Cl.
*B01J 8/00*    (2006.01)
(52) U.S. Cl. ..................... 422/127.9; 48/94; 48/95; 48/96; 422/202; 422/211; 429/17; 429/19; 429/20; 429/21
(58) Field of Classification Search ............... 422/202, 422/211; 48/94–96, 61; 429/17, 19–21
See application file for complete search history.

(56) References Cited

U.S. PATENT DOCUMENTS 5,226,928 A    7/1993   Makabe et al. ............... 48/94

6,284,398 B1   9/2001   Kiryu .......................... 429/19

FOREIGN PATENT DOCUMENTS

| DE | 16 67 573 | 7/1971 |
|---|---|---|
| DE | 690 04 943 | 5/1994 |
| DE | 197 21 630 | 2/1999 |
| EP | 0 435 642 | 7/1991 |
| EP | 0 977 293 | 2/2000 |
| JP | 60-54902 | 3/1985 |
| JP | 01167201 A * | 6/1989 |
| JP | 9-153372 | 6/1997 |
| JP | 09-153372 | 6/1997 |
| JP | 2000-15501 | 1/2000 |

* cited by examiner

*Primary Examiner*—Glenn Caldarola
*Assistant Examiner*—Vinit H. Patel
(74) *Attorney, Agent, or Firm*—Oblon, Spivak, McClelland, Maier & Neustadt, P.C.

(57) ABSTRACT

A reformer for a solid state polymer electrolyte fuel cell includes a burner 1 forming a flame, a reforming portion 2 surrounding the burner and having an exhaust port 22 and exhausting a reformed gas from the exhaust port 22; and a heat exchanger 4 having a higher temperature side, the higher temperature side being connected directly with the exhaust port 22 of the reforming portion 2, the heat exchanger 4 establishing heat exchange between the reformed gas and a raw material gas.

16 Claims, 12 Drawing Sheets

Steam + Raw Material Gas

Reformed Gas

Fig. 4

Steam + Raw Material Gas

Reformed Gas

FUEL REFORMER FOR USE IN FUEL CELL

The present application is based on and claims priority under 35 U.S.C. §119 with respect to Japanese Patent Application No. 2001-074729 on Mar. 15, 2001 (13th Year of Heisei), the entire content of which is incorporated herein by reference.

BACKGROUND OF THE INVENTION

1. Field of the Invention

The present invention is generally directed to a fuel reformer which includes a burner forming a flame, a reforming portion surrounding the burner and exhausting a reformed gas, and a heat exchanger establishing heat exchange between the reformed gas and a raw material gas.

2. Description of the Related Art

Figure 15:
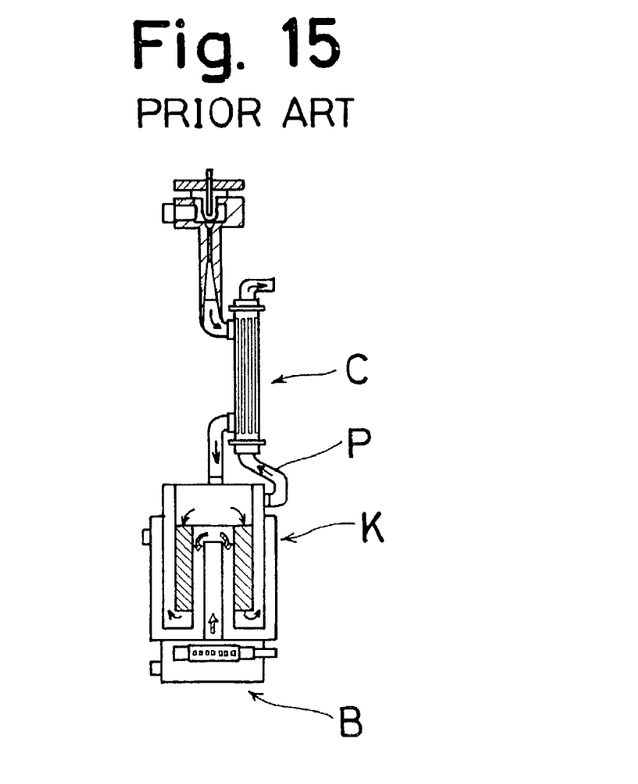
FIG. 15 is a schematic diagram of a conventional fuel reformer.

Referring to FIG. 15, there is illustrated a conventional fuel reformer which is disclosed in Japanese Patent Laid-open Print No. Hei. 9(1997)-153372. This fuel reformer is designed for obtaining hydrogen through steam reforming, from a hydrocarbon such as $CH_4$ or $C_3H_8$. In this fuel reformer, a reforming portion K is placed around a burner B which forms a flame. The reforming portion K is connected, by way of a conduit P, to a heat exchanger C so as to establish heat exchange between a reformed gas exhausted from the reforming portion and a raw material gas. The reforming portion K is configured to flow the heat-exchanged raw material gas such that the heat-exchanged raw material gas flows axially upwardly in an inner region, and then in an outer region flows axially downwardly.

Figure 16:
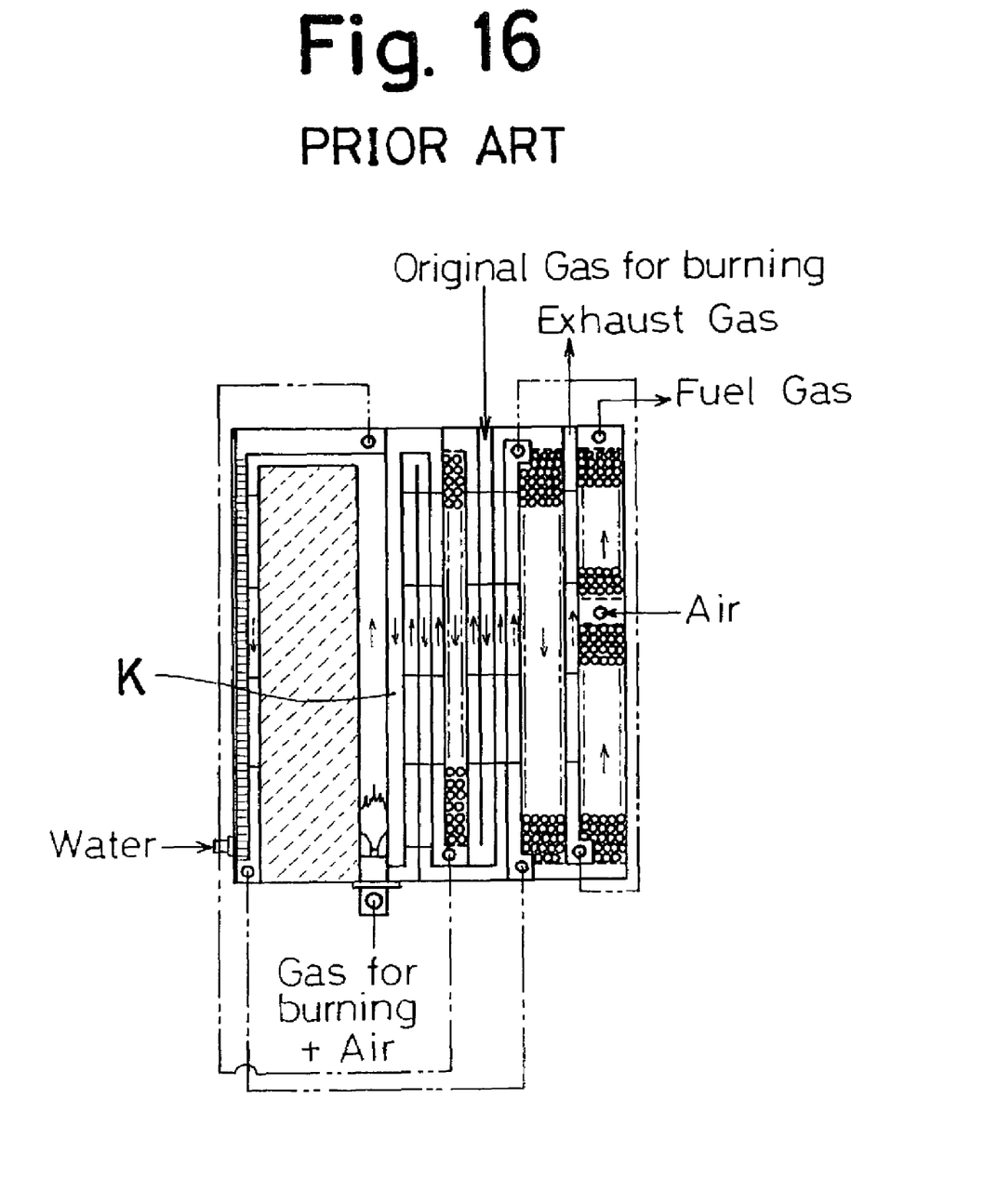
FIG. 16 is a cross-sectional view of a conventional device for producing a hydrogen containing gas.

In addition, as shown in FIG. 16, a conventional hydrogen containing gas producing device, which is disclosed in Japanese Patent Laid-open Print No. 2000-15501, produces steam by utilizing an exhaust gas of heating the portion K.

The abovementioned fuel reformer is applicable to phosphoric-acid fuel cells (PAFCs) in which steam is easily derived from a cell. On the contrary, there is a problem that the abovementioned fuel reformer is not applicable in solid-state polymer electrolyte fuel cells (PEFCs) in which steam cannot be derived from a cell due to its lower temperature.

In the above fuel reformer, despite the efficiency heat exchange for the reforming portion K, a problem occurs in heat loss due to the connection between the heat exchanger C and the reforming portion K which is established by interposing the conduit P therebetween.

Moreover, in the foregoing hydrogen containing gas producing device, a surface of the reforming portion which is to be heated is flat, resulting in that when the reforming portion is heated by the exhaust gas, the exhaust gas is concurrently released from the opposite side which is covered with a heat-insulating material.

Thus, a need exists to provide a fuel reformer for fuel cells, which is free from the aforementioned drawbacks.

SUMMARY OF THE INVENTION

Accordingly, in order to meet the above need to overcome the aforementioned drawbacks or problems, a first aspect of the present invention provides a fuel reformer for solid-state polymer electrolyte fuel cells which comprises a burner; a reforming portion surrounding the burner, having an exhaust port, and exhausting a reformed gas from the exhaust port; and a heat exchanger having a higher temperature side, the higher temperature side being connected directly with the exhaust port of the reforming portion, the heat exchanger establishing heat exchange between the reformed gas and a raw material gas.

In accordance with the first aspect of the present invention, the direct connection of the exhaust port of the reforming portion to the higher temperature side of the heat exchanger makes the reforming portion and the heat exchanger substantially integral, resulting in a possibility of lessening the heat loss in a path from the reforming portion to the heat exchanger.

A second aspect of the present invention is to provide a fuel reformer whose gist is to modify the structure of the first aspect, wherein the reforming portion is arranged concentrically around the burner and has labyrinth flow paths such that the burner exhaust gas and the heat exchanged raw material gas respectively flow axially and radially in opposite directions.

In accordance with the second aspect of the present invention, the burning heat at the burner can be transmitted efficiently to the reforming portion.

A third aspect of the present invention is to provide a fuel reformer whose gist is to add the structure of the first aspect an evaporator placed outside the reforming portion, the evaporator generating steam by a heat of the exhaust gas.

In accordance with the third aspect of the present invention, producing the steam can be established at the evaporator after efficient heat transmission from the burner to the reforming portion, resulting in more efficient reforming.

A fourth aspect of the present invention is to provide a fuel reformer whose gist is to modify the structure of the third aspect, wherein the heat exchanger is in the form of a counter-flow type and is formed with a plate-fin type metal plates such as stainless steel, the steam is, together with the raw material gas, brought into heat exchange with the reformed gas, and the resulting steam and raw material gas are fed to the reforming portion.

In accordance with the fourth aspect of the present invention, a relatively large heat transfer area per unit area and higher-efficient convection can be realized, which makes it possible to establish effective heat exchange between the reformed gas and each of the steam and the raw material gas. In addition, the resultant or heat exchanged steam and raw material gas are fed to the reforming portion, which makes the reforming more efficient.

A fifth aspect of the present invention is to provide a fuel reformer whose gist is to modify the structure of the fourth aspect, wherein the heat exchanger includes a plurality of tubes, each of the tubes being provided therein with a plurality of fins, and a plurality of fins interposed between the tubes. The reformed gas flows through the tubes, and both the steam and the raw material gas flow through a passage defined between the tubes.

In accordance with the fifth aspect of the present invention, the reformed gas can be brought into efficient heat exchange with each of the steam and the raw material gas.

A sixth aspect of the present invention is to provide a fuel reformer whose gist is to modify the structure of the third aspect, wherein a conduit for introducing a water into the evaporator is arranged around the reforming portion in a spiral mode.

In accordance with the sixth aspect of the present invention, heat radiation from the reforming portion can be easily recovered.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Hereinafter, embodiments of the present invention will be described in detail with reference to the attached drawings.

[First Embodiment]

Referring first to FIGS. 1 to 10 inclusive, there is illustrated a fuel reformer in accordance with a first embodiment of the present invention. The fuel reformer includes a reforming portion 2 which surrounds a burner 1 which forms a flame, and a heat exchanger 4 for establishing heat exchange between a raw material gas and a reformed gas fed or exhausted from the reforming portion 2. There is a direct connection between an exhaust port 22 of the reforming portion 2 and a higher temperature side of the heat exchanger 4.

Figure 1:
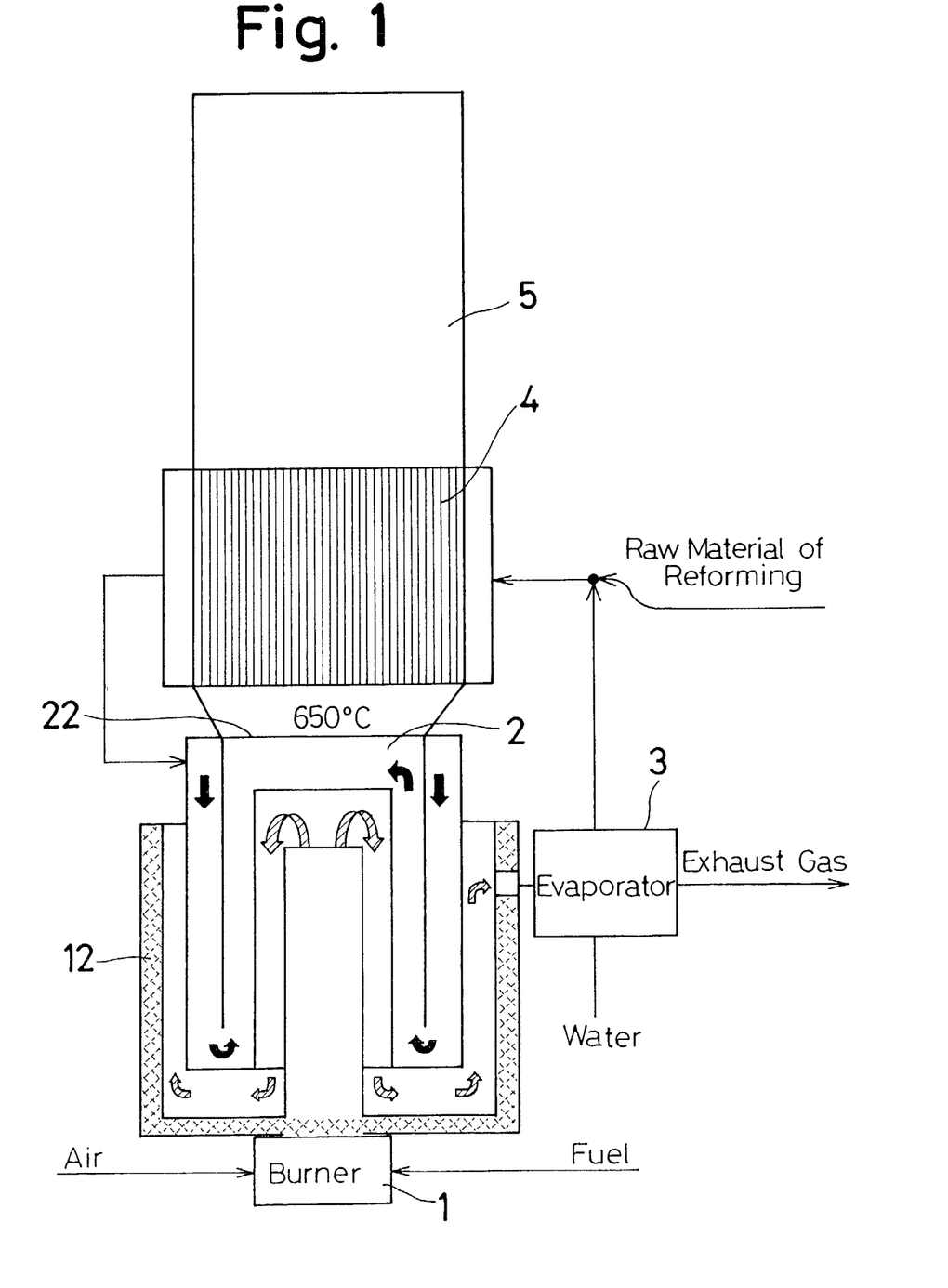
FIG. 1 is a schematic diagram of a first embodiment of a fuel reformer in accordance with the present invention.
Figure 2:
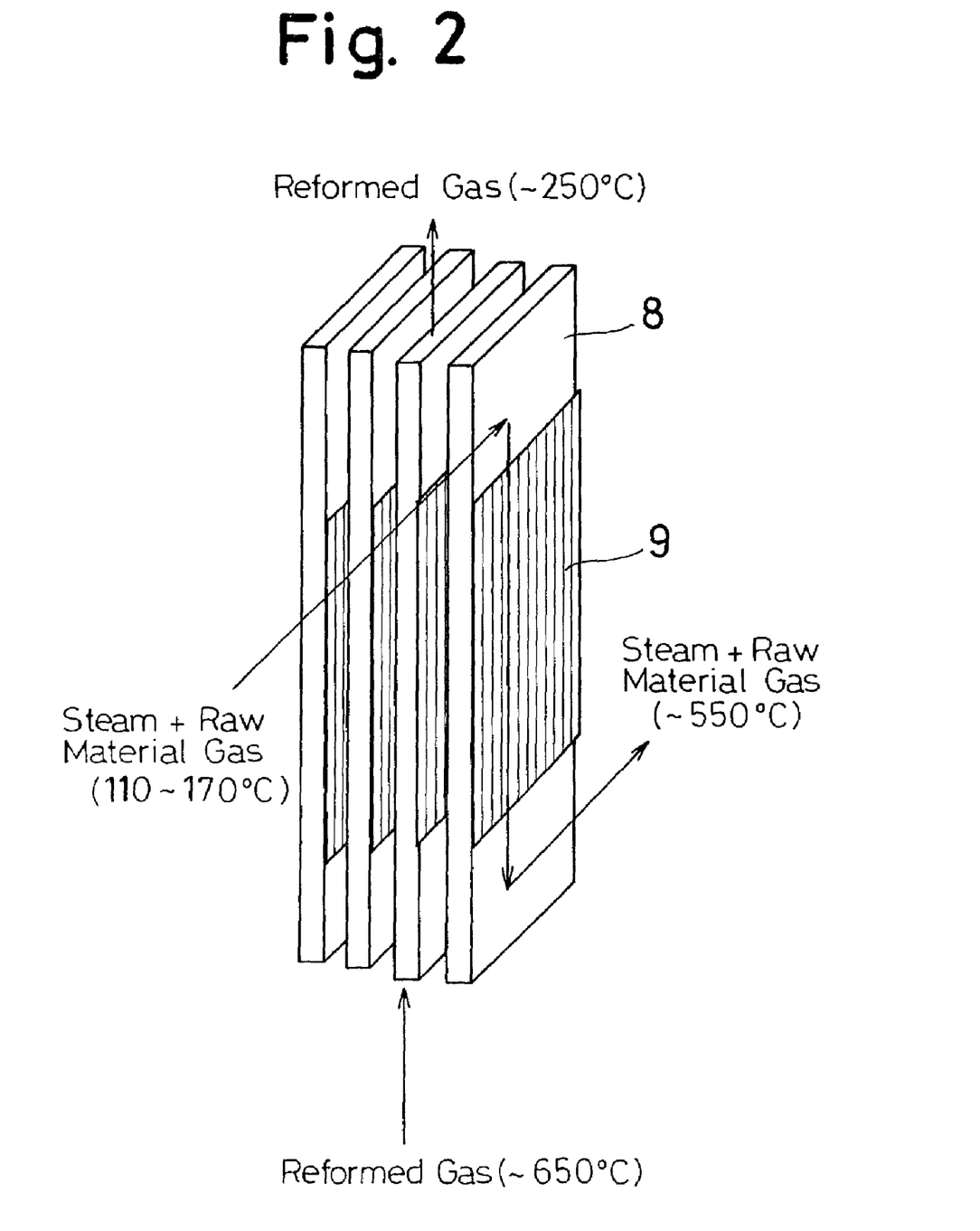
FIG. 2 is a perspective view illustrating how gases flow in a heat exchanger of the fuel reformer shown in FIG. 1.
Figure 3:
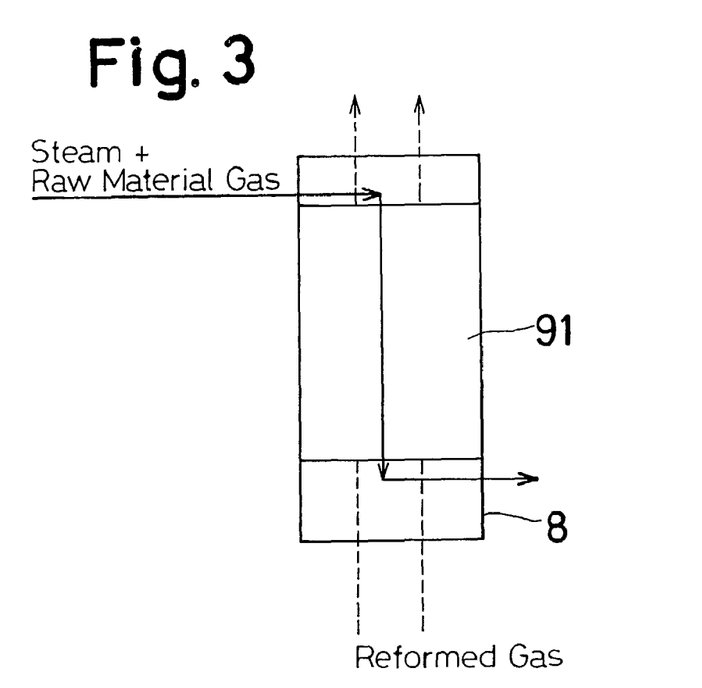
FIG. 3 is a schematic illustration of a cross-section of an outer fin of the heat exchanger of the fuel reformer shown in FIG. 1.
Figure 4:
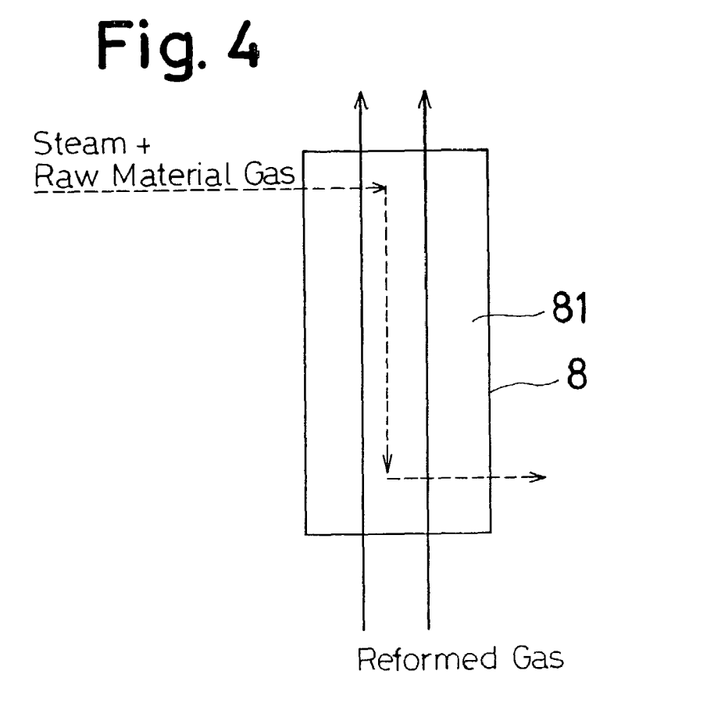
FIG. 4 is a schematic illustration of a cross-section of a tube of the heat exchanger of the fuel reformer shown in FIG. 1.
Figure 5:
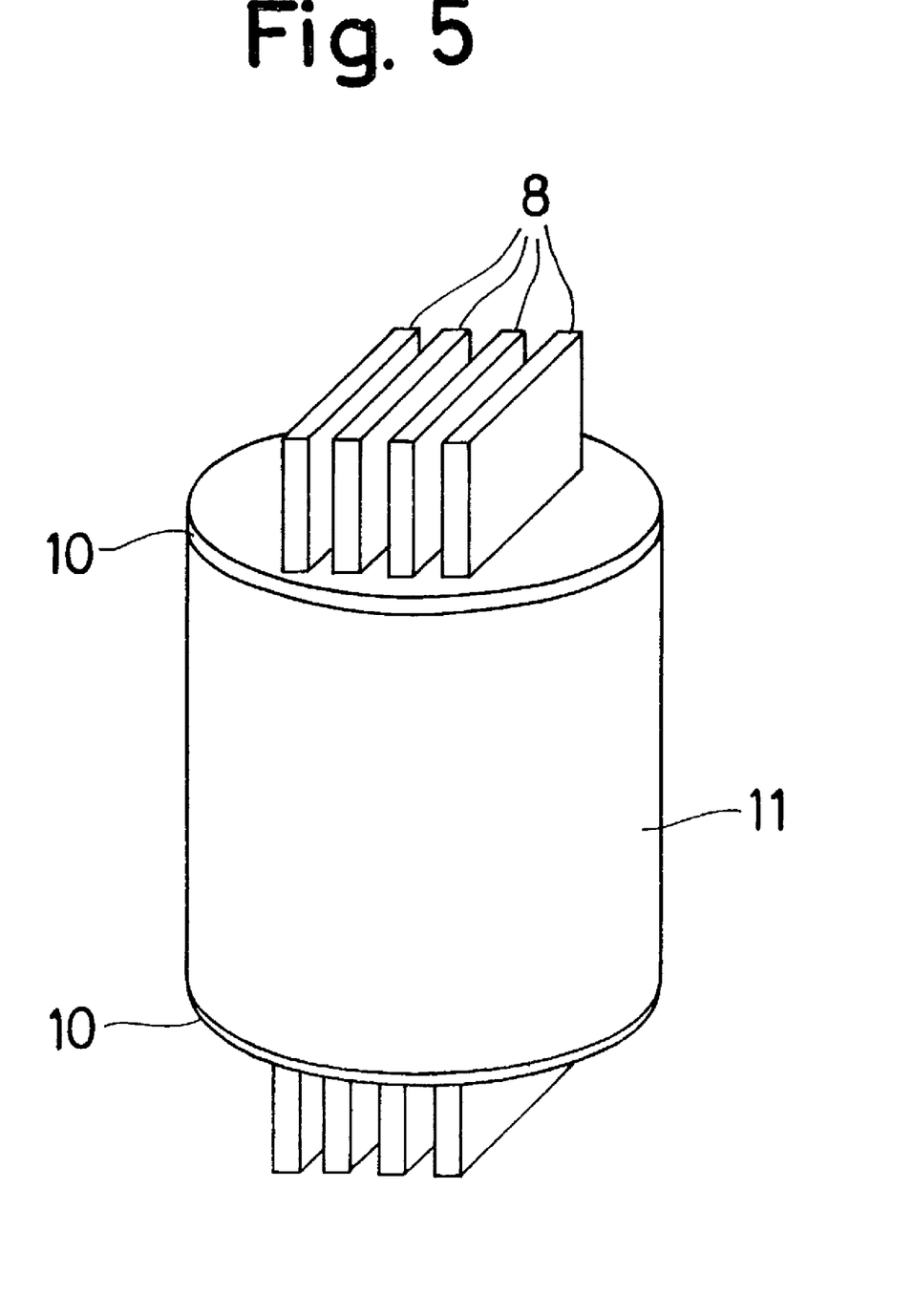
FIG. 5 is a perspective view illustrating an internal structure of the heat exchanger of the fuel reformer shown in FIG. 1.
Figure 6:
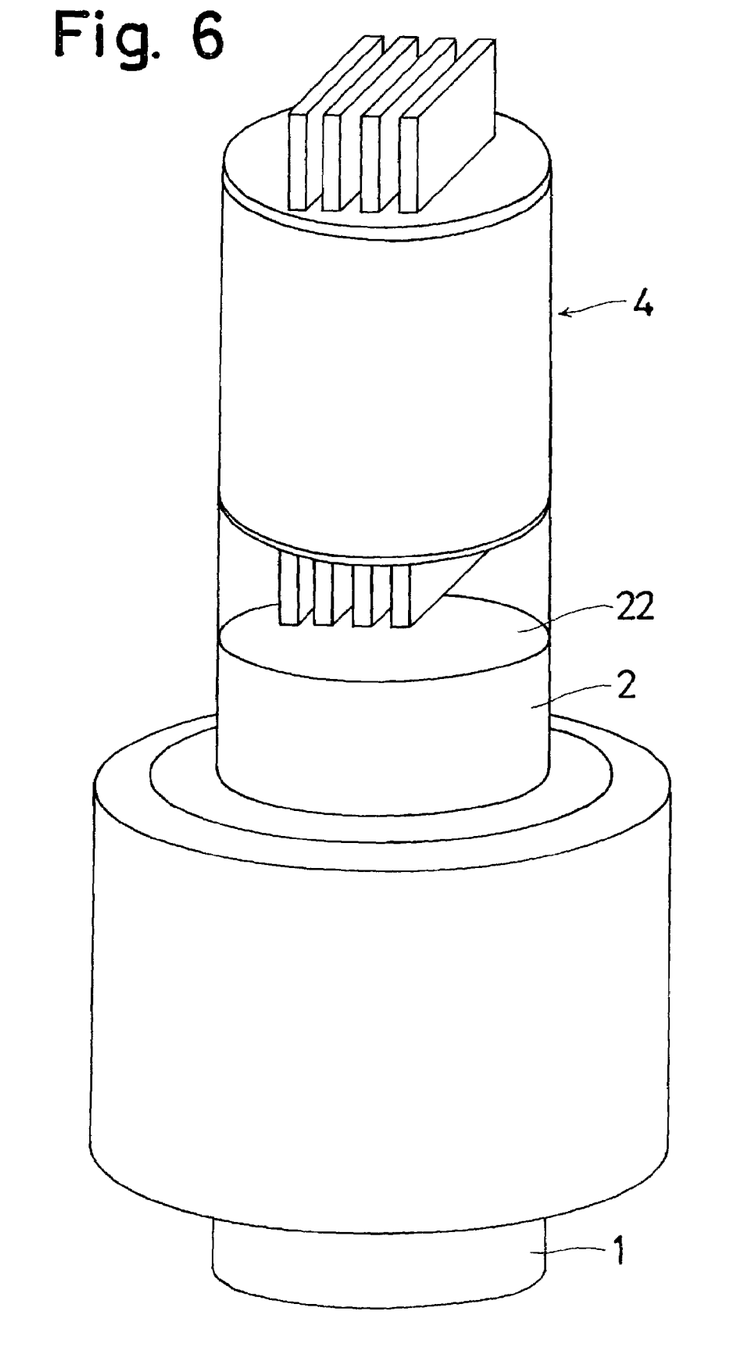
FIG. 6 is a perspective view illustrating how a burner, the reforming portion, and the heat exchanger are arranged in the fuel reformer.
Figure 7:
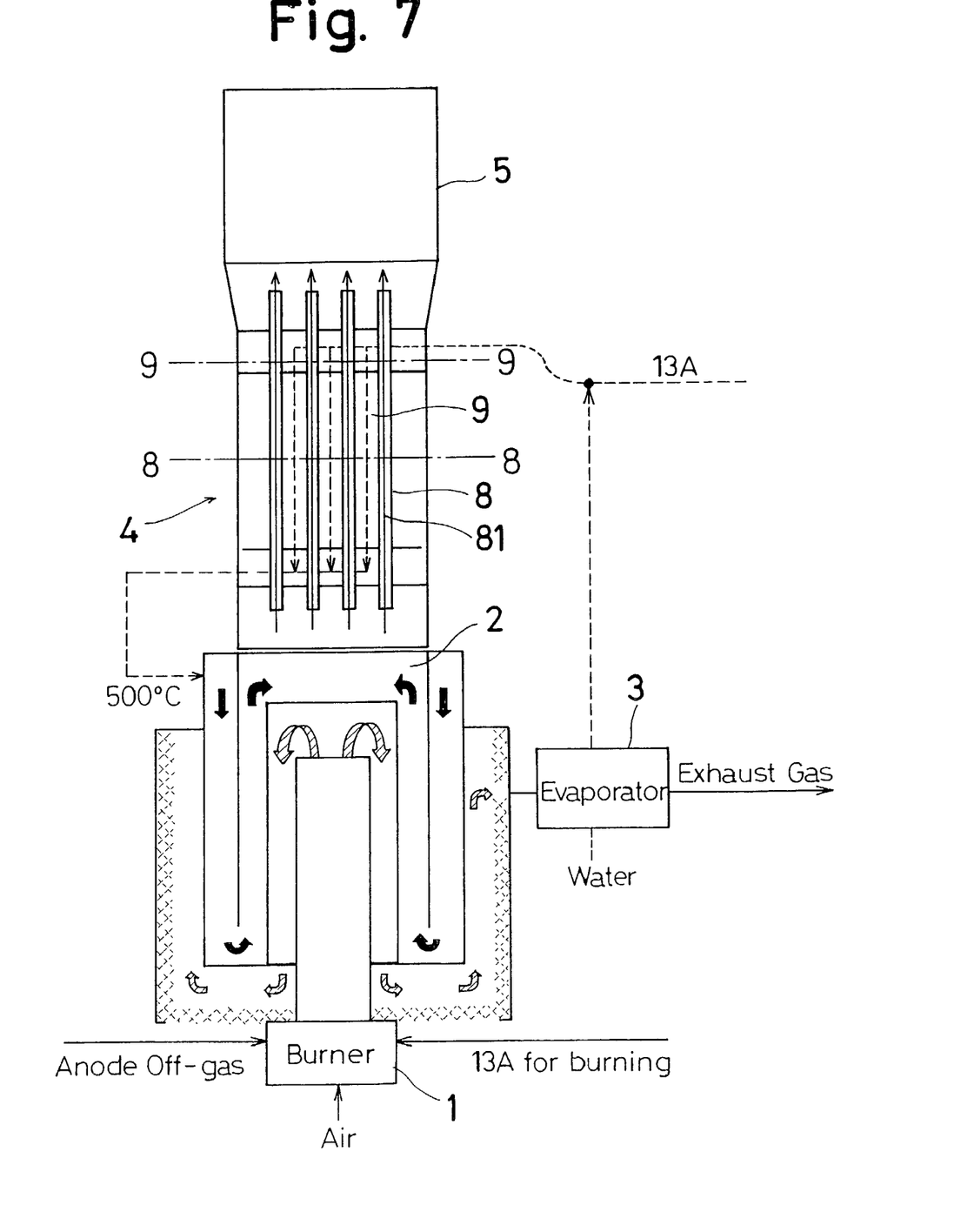
FIG. 7 is a schematic diagram illustrating how the reformed gas flows in the fuel reformer shown in FIG. 1.
Figure 8:
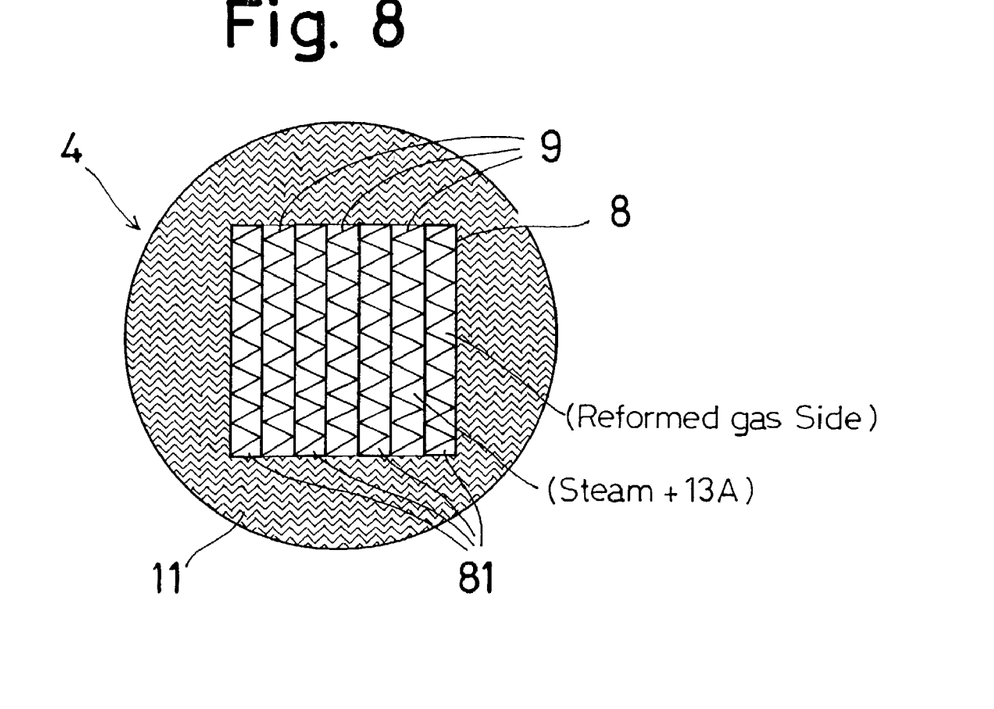
FIG. 8 is a cross-sectional view taken along line 8—8 in FIG. 7.
Figure 9:
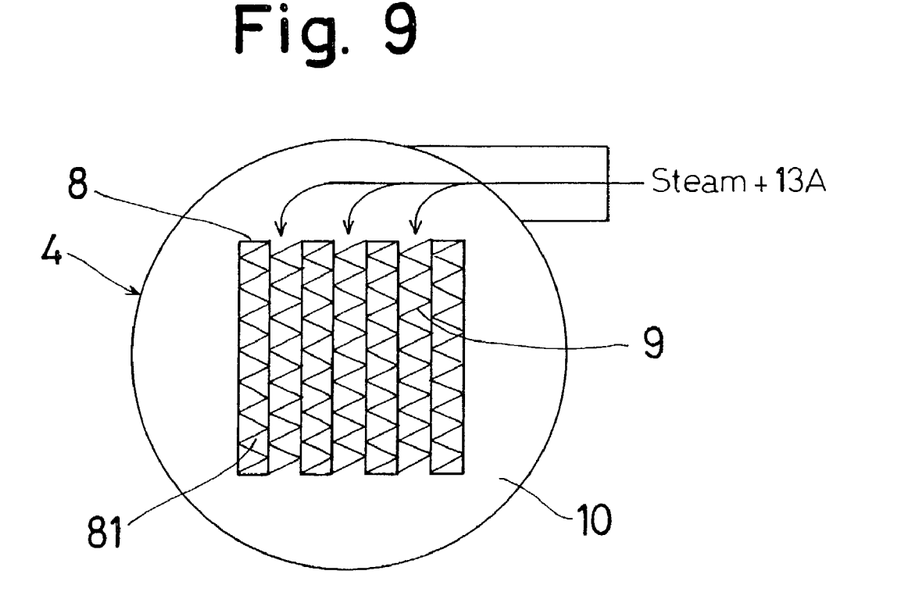
FIG. 9 is a cross-sectional view taken along line 9—9 in FIG. 7.
Figure 10:
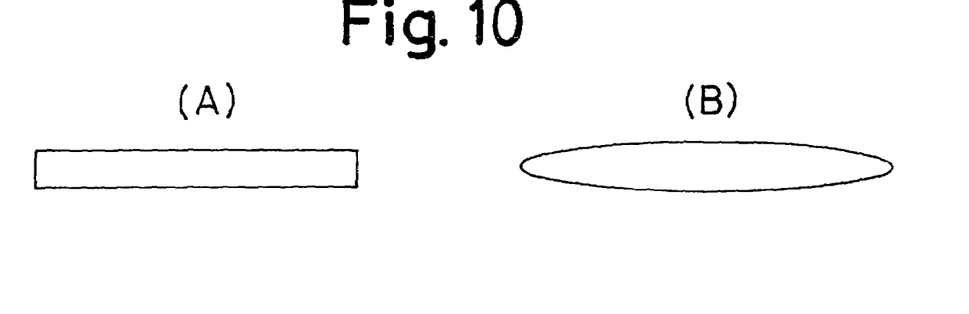
FIGS. 10A–10B schematically show two examples of heat exchange tube cross sections in the heat exchanger according to the first embodiment.

In detail, as shown in FIG. 1, the fuel reformer in accordance with the first embodiment of the present invention includes the flame forming burner 1, the reforming portion 2 which is formed of a ruthenium catalyst and whose exhaust port 22 is in direct connection with the higher temperature side of the heat exchanger 4 for supplying thereto the reformed gas, and an evaporator 3 for supplying steam to the heat exchanger 4, which steam is produced by evaporating water with a burner exhaust gas. The heat exchanger 4 performs heat-exchange for the reformed gas from the reforming portion 2, with each of the raw material gas and the steam, and includes a CO-shift portion 5 which is formed of a copper and zinc group catalyst and to which the heat exchanged reformed gas is supplied.

In the present embodiment, the reforming portion 2 is formed in a cylindrical configuration concentrically around a central burner 1. The exhaust port 22 of the reforming portion 2 is in direct connection with the higher temperature side of the heat exchanger 4, which requires no conduit for an introduction of the reformed gas into the heat exchanger 4.

Outside the reforming portion 2, there is placed the evaporator 3 which produces the steam by using the burner exhaust gas resulting from heating in the reforming portion 2.

As the heat exchanger 4, a counter-flow type heat exchanger of a plate fin type is employed due to the fact that the plate fins can increase the heat transmission area per unit area and increase heat exchange efficiency, which is desirable in view of the need to lower the temperature of the reformed gas from about 650° C. to 200° C.

The heat exchanger 4 includes a cylindrical body with closed ends 10, and plurality of stainless steel tubes 8 passing through the body and the closed ends. Each of the tubes 8 has a rectangular cross-section (cf. FIG. 10(A)) or an oval cross-section (cf. FIG. 10(B)) and has inner fins 81. Thus structured, each tube 8 allows the reformed gas which comes from the reforming portion 2 to pass therethrough to the shift reactor portion 5. A path is defined between the two adjacent tubes 8 in which fins 9 are provided in sandwiched fashion. This path allows a manufactured or city gas as the raw material gas, and the steam, to pass.

Figure 14:
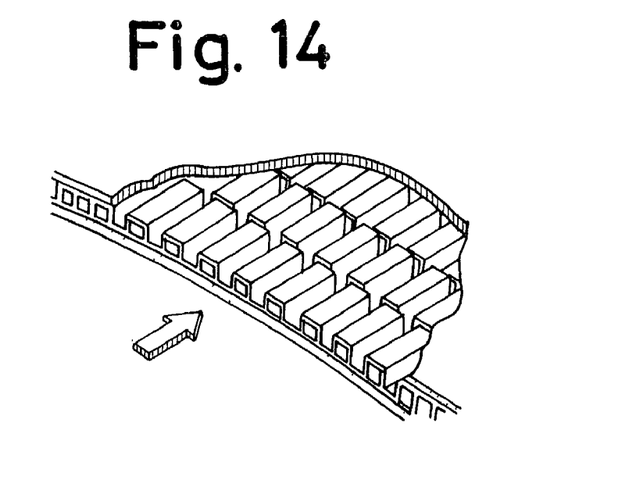
FIG. 14 is a partial perspective view of an example of an offset fin which is employed in the fuel reformer shown in FIG. 1.

In the above heat exchanger 4, a core portion which constitutes the counter-flow type heat exchanger of the plate fin type is made up of the tubes 8 and the fins 9. The fins 9 are in the form of offset fin segments such as shown in FIG. 14. The illustrated structures are made from the viewpoint of heat-exchange efficiency.

As the cross-section of the heat exchange tube 8, as shown in FIGS. 10(A) and (B), two kinds are available. If the cross-section of the tube 8 is made rectangular as shown in FIG. 10(A), such a tube 8 is easy to process, particularly to bend. In addition, many flat portions make it easy to establish good thermal contact with fins as will be detailed later. On the other hand, in case of the oval cross-section, the tube 8 is free from corners, which makes it possible to establish good contact with other elements of the heat exchanger. In addition, due to the fact that no stress riser or stress concentrating portion is present, the oval tube 8 is superior in durability as compared to the rectangular cross sectioned tube 8. In the present embodiment, the rectangular cross-sectioned tube 8 is employed in view of its low gas pressure, good connecting property to the fins and excellent workability as compared to the superior durability of the oval cross-section.

The reformed gas and each of the steam and the raw material gas, while flowing in the circuit shown in FIGS. 2 to 9 inclusive, establish heat-exchange with each other. That is to say, the reformed gas which comes from the reformer passes through each of the tubes 8, while the city gas 13A as the raw material for reforming and the steam are made to pass the fins 9 which are interposed between two adjacent tubes 8.

Between the inner surface of the heat exchanger 4 and the outer surface of each of the tubes 8, a stainless-steel material is interposed or provided to define a path for enabling the flow of the reformed gas around the set of the tubes 8 as well as for establishing heat insulation of the reformed gas from the outside.

The fuel reforming device having the above structure in accordance with the first embodiment of the present invention operates as follows:

The raw material to be reformed, i.e., a city gas 13A whose main component is methane, is mixed with the steam which is produced by the exhaust gas of the burner 1 in the evaporator 3 and is pre-heated to about 500° C. in the heat exchanger 4, after which it is introduced into the reforming portion 2. The resulting mixture, while being heated by the burner 1, causes a main chemical reaction and a side chemical reaction.

[Main Chemical Reaction]

$$CH_4 + H_2O \leftrightarrows CO + 3H_2$$

[Side Chemical Reaction]

$$CO + H_2O \leftrightarrows CO_2 + H_2$$

At this state, the burner 1 is adjusted in burning amount in order to make the output temperature of the reformed gas about 650° C. The resultant gas which comes from the reforming portion 2 establishes heat exchange with the raw material gas and is cooled down to a temperature ranging from 200 to about 250° C., which causes a shift chemical reaction at the shift portion 5 which is similar to the above-mentioned side chemical reaction. After completion of such a CO-shift, the CO-content is reduced to less than or equal to 1%.

The fuel reformer in accordance with the first embodiment of the present invention is made up of the burner 1 forming a flame; the reforming portion 2 surrounding the burner 1 having an exhaust port and exhausting the reformed gas from the exhaust port; and the heat exchanger 4 having a higher temperature side, the higher temperature side being connected directly with the exhaust port of the reforming portion 2, the heat exchanger 4 establishing heat exchange between the reformed gas and the raw material gas. Thus, the direct connection of the exhaust port of the reforming portion to the higher temperature side of the heat exchanger 4 is established, which makes the reforming portion 2 and the heat exchanger 4 substantially integral, resulting in a possibility of lessening the heat loss at a path from the reforming portion 2 to the heat exchanger 4.

In the reforming device according to the first embodiment, the reforming portion 2 is arranged concentrically around the burner 1 and has labyrinth gas flow paths arranged such that the burner exhaust gas and the heat exchanged raw material gas respectively flow axially and radially in opposite directions. Thus, the combustion heat of the burner 1 can be transmitted efficiently to the reforming portion.

In addition, in the fuel reformer according to the first embodiment, the evaporator 3 which generates the steam by the heat of the exhaust gas is placed outside the reforming portion. Thus, steam can be produced at the evaporator 3 after efficient transmission of heat from the burner 1 to the reforming portion 2, resulting in efficient reforming.

In the fuel reformer according to the first embodiment, the heat exchanger 4 is a counter-flow type formed as a plate-fin type with metal plates such as a stainless steel. The steam, together with the raw material gas, is brought into heat exchange with the reformed gas, and the resulting steam and raw material gas are fed to the reforming portion 2. Thus, a relatively large heat transfer area per unit area and higher-efficiency convection can be realized, which makes it possible to establish an effective heat exchange between the reformed gas and each of the steam and the raw material gas. In addition, the resultant or heat exchanged steam and raw material gas are fed to the reforming portion 2, which makes the reforming much higher in efficiency.

In addition, in the fuel reformer according to the first embodiment, the heat exchanger 4 includes a plurality of tubes 8, each of the tubes 8 being provided therein with a plurality of fins 9. The reformed gas flows through the tubes 8, and both the steam and the raw material gas flow through a passage defined between the tubes 8. Thus, the reformed gas can be brought into efficient heat exchange 4 with each of the steam and the raw material gas.

Moreover, in the fuel reformer according to the first embodiment, a stainless steel material 11 is provided in the heat exchanger 4, which forms a path for flowing the reformed gas along the tubes 8 and which isolates the tubes 8 from the outside.

[Second Embodiment]

Figure 11:
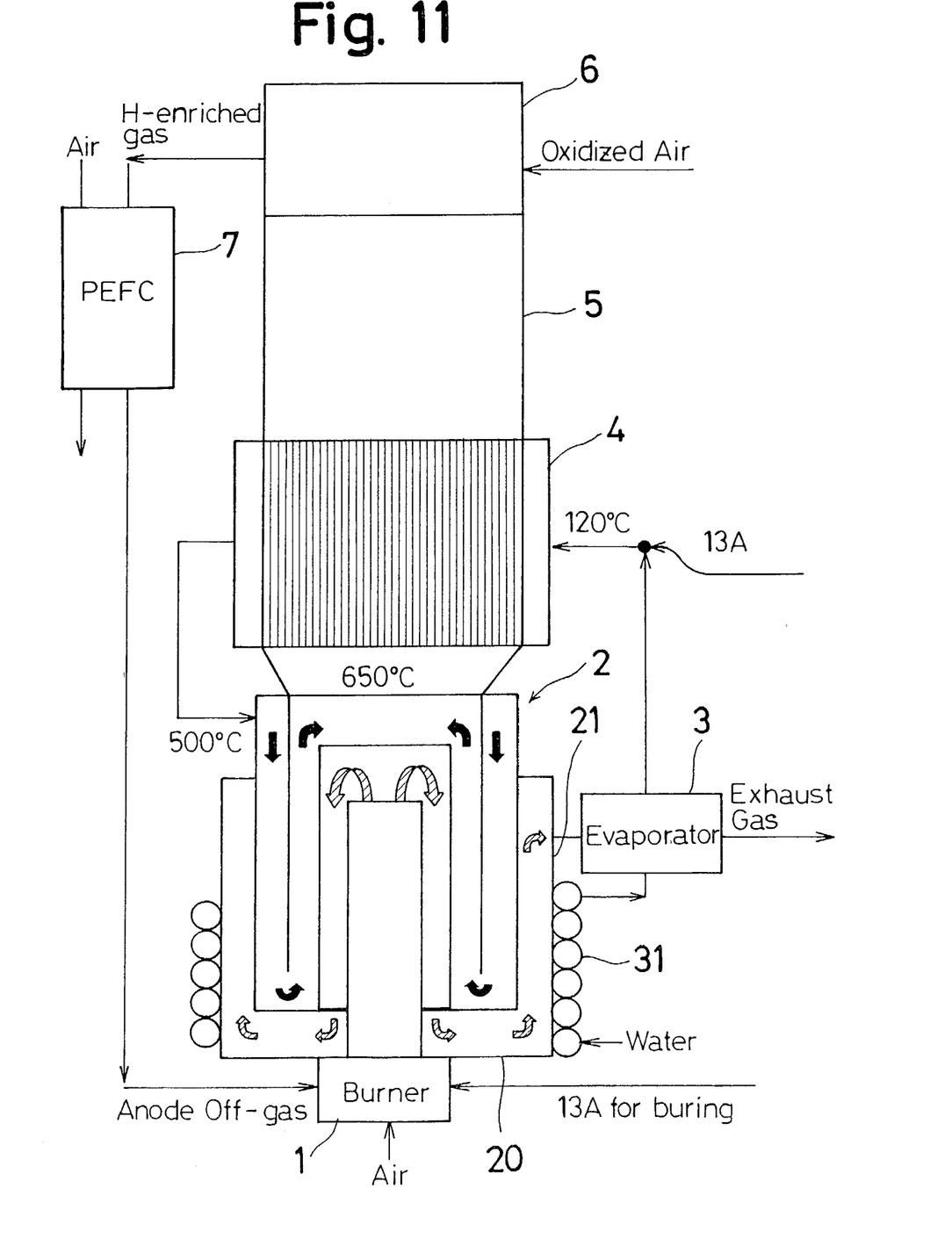
FIG. 11 is a schematic diagram of a second embodiment of a fuel reformer in accordance with the present invention.

A fuel cell reformer in accordance a second embodiment which is illustrated in FIG. 11 is identical with the fuel cell reformer according to the first embodiment except that a water to be introduced into the evaporator 3 passes through a conduit 31 which is spirally arranged or wound on the reforming portion 2. Hereinafter, only such a major difference and other related minor differences will be described.

In a PEFC type fuel cell 7 which utilizes natural gas, the CO-content in the natural gas to be introduced into the fuel cell 7 should be limited to be equal to or less than 10 ppm for preventing possible CO-poisoning. Thus, a selective oxidizing portion 6 which is formed of ruthenium catalyst is provided after shifting in order to reduce the CO-content to equal to or less than 10 ppm by causing the following chemical reaction.

$$CO + (½)O_2 \leftrightarrows CO_2$$

The exhaust gas contains an amount of hydrogen gas due to the fact that the actually consumed amount of hydrogen gas is as high as 90–95% of the amount of the hydrogen gas introduced into the fuel cell 7. This remaining gas, i.e., the off gas at the anode electrode of the fuel cell 7, is used as a part of the fuel to be burned at the burner 1 which is placed in the reforming portion 2.

On the other hand, water is fed into the evaporator 3 by way of the conduit 31 which is spirally arranged on the outer wall 21 of the cylinder portion 20 such that the water is heated or warmed up during its movement in the conduit 31. The outer wall 21 defines therein a flow path which allows the exhaust gas coming from the burner 1 to move upwardly and downwardly from its inner portion to outer portion, respectively.

In the present embodiment, radiated heat from the reforming portion 2 is utilized by arranging the conduit 31 in spiral fashion around the reforming portion 2, which further improves the heat efficiency.

Figure 12:
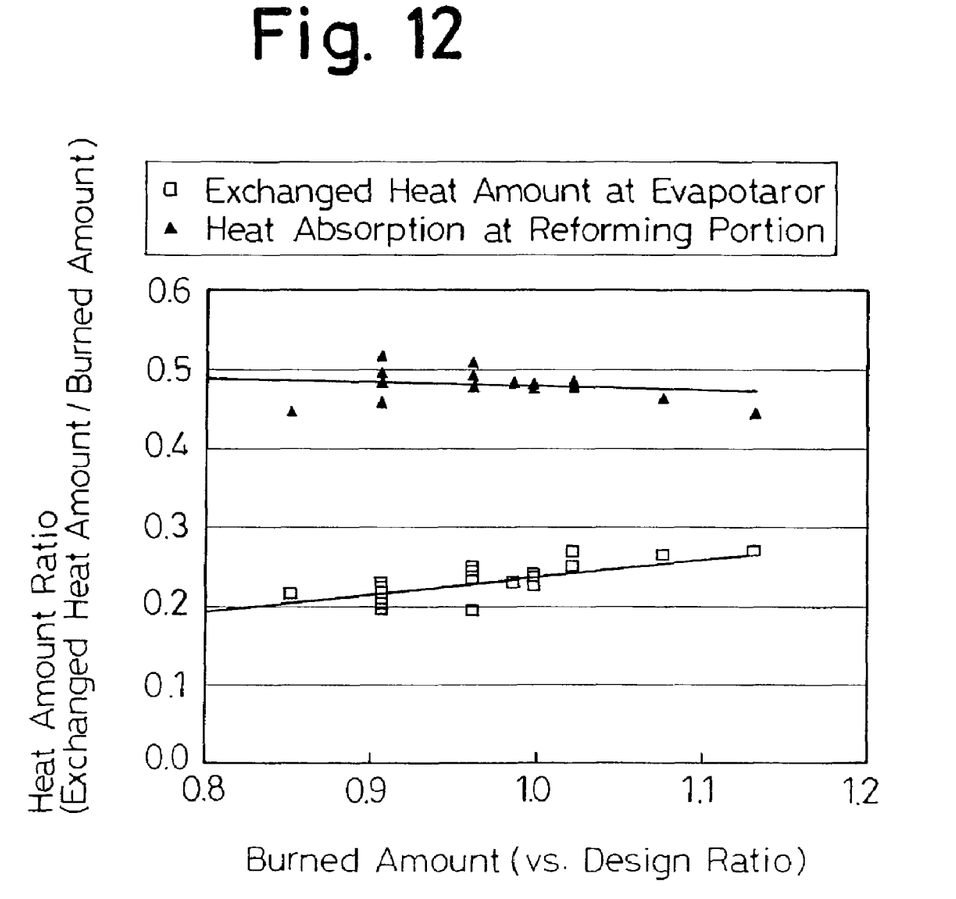
FIG. 12 is a heat flow chart of the fuel reformer shown in FIG. 11.

FIG. 12 represents a graph of the heat absorption amount at the reform portion 2 (at the evaporator 3) versus the burning amount. This graph shows that about 50% and about 25% of the burner heat are given to the reforming portion 2 and to the evaporator 3, respectively. This reveals that the burning heat is well utilized. The heat-exchange rate at the heat exchanger 4 is found to be as high as 75–80%.

[Others]

In the first embodiment, the fins 81 can be modified to carry thereon a high-temperature shift catalyst. Such a modification would make it possible to make the shift reaction smooth and quick, thereby reducing the load capacity of the low-temperature shift portion 5 placed at a downstream side of the heat exchanging portion.

Figure 13:
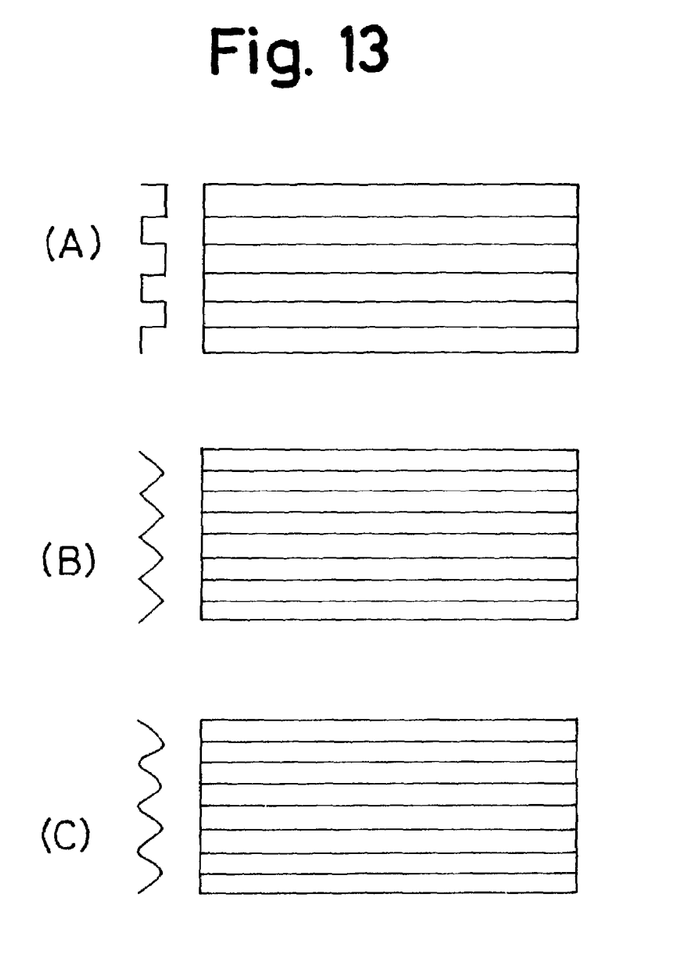
FIGS. 13A–13C illustrates three examples of fins employed in the fuel reformer shown in FIG. 1.

With respect to the shape of the fins provided in the heat exchanger 4, various types are available such as a rectangular cross-section type (FIG. 13 (A)), a saw-toothed cross-section type (FIG. 13(B)), a corrugated cross-section type (FIG. 13(C)), and an offset fin (FIG. 14). The offset fin is preferable in view of promotion of in-tube gas mixture, heat transfer promotion by turbulent flow effect, and compatibility with a rectangular cross-section tube.

The invention has thus been shown and described with reference to specific embodiments. However, it should be understood that the invention is in no way limited to the details of the illustrated structures but changes and modifications may be made without departing from the scope of the appended claims.

What is claimed is:

1. A fuel reformer for solid-state polymer electrolyte fuel cells, comprising:
    a burner;
    a reforming portion surrounding the burner, the reforming portion having an inside portion, an outside portion arranged outside of the inside portion so as to be separated therefrom, a gas inlet provided to the outside portion at one end thereof in the axial direction and a gas exhaust provided to the inside portion at one end thereof in the axial direction, wherein the inside portion is communicated with the outside portion at the other end of the inside and outside portions;
    a heat exchanger having a higher temperature side connected directly with the exhaust of the reforming portion;
    a burner exhaust flow path associated with the burner, the burner gas exhaust flow path having an inner portion arranged inside of the inside portion of the reforming portion so as to be joined with the burner, an outer portion arranged outside of the outside portion of the reforming portion so as to be connected to the inner portion as well as to a burner exhaust gas exit.

2. A fuel reformer as set forth in claim 1, further comprising an evaporator placed outside the reforming portion, the evaporator receiving heat from an exhaust gas from the burner.

3. A fuel reformer as set forth in claim 2, wherein the heat exchanger is a counter-flow heat exchanger and is formed with stainless steel plates and fins.

4. A fuel reformer as set forth in claim 3, wherein the heat exchanger includes a plurality of tubes, and wherein a plurality of fins are associated with each of the tubes such that fins are interposed between adjacent tubes of the plurality of tubes.

5. A fuel reformer as set forth in claim 2, further comprising a conduit connected to the evaporator arranged in a spiral around the reforming portion.

6. A fuel reformer for solid-state polymer electrolyte fuel cells, comprising:
    a burner, wherein a burner exhaust gas flow path is associated with said burner such that burner exhaust gas flows along a burner exhaust gas flow path from said burner to a burner exhaust gas exit, with said burner exhaust gas flow path extending from said burner to said burner exhaust gas exit;
    a reforming portion surrounding the burner, the reforming portion having a gas inlet and a gas exhaust, and wherein a reforming portion gas flow path extends from the gas inlet to the gas exhaust; and
    a heat exchanger for establishing heat exchange between a reformed gas from the reforming portion and a raw material gas;
    wherein a flow direction in the burner exhaust gas flow path is opposed to a flow direction in said reforming portion gas flow path.

7. A fuel reformer as set forth in claim 6, wherein said heat exchanger is positioned directly above and directly over said burner and at least part of said reforming portion.

8. A fuel reformer as recited in claim 7, wherein said heat exchanger includes a higher temperature side having an inlet which is directly connected to said exhaust of said reforming portion such that the reformed gas exiting said exhaust of said reforming portion flows directly into said inlet of said high temperature side of said heat exchanger without any additional conduits between said exhaust of said reforming portion and said inlet of said higher temperature side of said heat exchanger.

9. A fuel reformer as recited in claim 6, wherein said reforming portion is substantially cylindrical and is arranged concentrically around said burner, and wherein gases flow along said burner exhaust gas flow path in a radially outward direction and gases flow along said reforming portion gas flow path in a radially inward direction.

10. A fuel reformer as recited in claim 9, wherein said heat exchanger is arranged and coupled to said reforming portion such that the raw materials gas passes through said heat exchanger prior to entering the gas inlet of the reforming portion and the raw materials gas is heated by the reformed gas that exits said gas exhaust of said reforming portion and enters an inlet of a higher temperature side of said heat exchanger; and
    wherein the fuel reformer further includes an evaporator which receives exhaust gas from the burner, and wherein said evaporator produces steam which is mixed with said raw materials gas prior to entry into said heat exchanger.

11. A fuel reformer as recited in claim 6, wherein said heat exchanger is arranged and coupled to said reforming portion such that the raw materials gas passes through said heat exchanger prior to entering the gas inlet of the reforming portion and the raw materials gas is heated by the reformed gas that exits said gas exhaust of said reforming portion and enters an inlet of a higher temperature side of said heat exchanger; and
    wherein the fuel reformer further includes an evaporator which receives exhaust gas from the burner, and wherein said evaporator produces steam which is mixed with said raw materials gas prior to entry into said heat exchanger.

12. A fuel reformer as recited in claim 11, wherein said gas inlet of said reforming portion is closer to a periphery of the reforming portion than the gas exhaust of the reforming portion.

13. A fuel reformer for solid-state polymer electrolyte fuel cells comprising:
    a burner;
    a reforming portion formed in a cylindrical configuration concentrically around the burner, the reforming portion including a gas inlet, a gas exhaust, and a reforming portion gas flow path extending from said gas inlet to said gas exhaust, wherein said gas inlet is positioned closer to an outer circumference of said cylindrical reforming portion than said gas exhaust and the gas exhaust is positioned at an inner side of the reforming portion;

a heat exchanger positioned directly above and directly over said burner and at least part of said reforming portion; and wherein said heat exchanger is arranged to receive gas to be reformed and heat the gas to be reformed and after heating of said gas to be reformed the gas is fed to the inlet of the reforming portion and flows inwardly along said reforming gas flow path to said gas exhaust of said reforming portion, and wherein gases exiting said gas exhaust of said reforming portion are fed to said heat exchanger.

14. A fuel reformer as recited in claim 13, wherein gases exiting said gas exhaust of said reforming portion are fed directly to a bottom of said heat exchanger.

15. A fuel reformer as recited in claim 13, wherein said reforming portion is substantially cylindrical and gases flow along said reforming portion gas flow path in a radially inward direction from said gas inlet to said gas exhaust, and wherein said gas exhaust is located at a center of said reforming portion;

wherein the fuel reformer further includes a burner exhaust gas flow path extending from said burner and radially outward toward the periphery of the reforming portion; and wherein gases exiting said gas exhaust of said reforming portion are fed to a bottom of said heat exchanger.

16. A fuel reformer as recited in claim 15, further including an evaporator which receives exhaust gases from said burner and which produces steam;

wherein said fuel reformer is arranged such that steam from said evaporator is mixed with a gas to be reformed prior to entry into said heat exchanger; and wherein a CO-shift portion is disposed above said heat exchanger.

* * * * *